Feb. 7, 1939.    H. A. NELSON    2,145,990
CHAIN FASTENER
Filed May 19, 1937

INVENTOR.
H. A. NELSON
BY M. Talbert Dick
ATTORNEY.

Patented Feb. 7, 1939

2,145,990

UNITED STATES PATENT OFFICE 2,145,990

CHAIN FASTENER

Hans A. Nelson, Exira, Iowa

Application May 19, 1937, Serial No. 143,526

1 Claim. (Cl. 59—85)

The principal object of my invention is to provide a chain fastening unit connected with one end of a link chain that may be connected, attached to or detached from any of the other links of the chain.

A further object of this invention is to provide a chain fastener that is capable of engaging any of the links of a chain, thereby eliminating the necessity of special receiving links in the chain.

A still further object of my invention is to provide a chain fastener that does not have a tendency to become accidentally detached from a chain link once it has been manually placed in hooked relationship with one of the links of the chain.

A still further object of this invention is to provide a chain fastener that when in operative position connecting two links of the chain together provides a substantially straight pull connection.

A still further object of my invention is to provide a chain fastener that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claim and illustrated in the accompanying drawing, in which:

Figure 1:
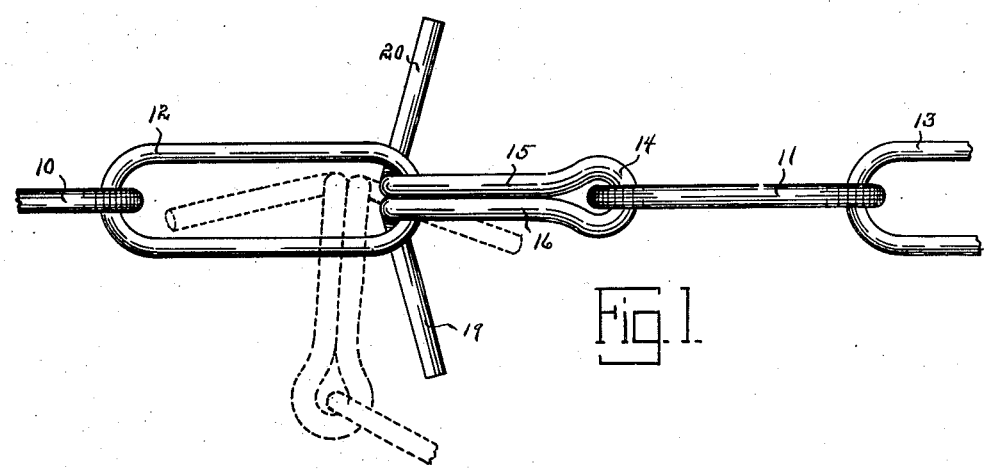
Fig. 1 is a plan view of my chain fastener operatively connecting two links of the chain together with dotted lines showing the position of the fastener when it is desired to unhook or hook the fastener into one of the chain links.

Devices for detachably securing two links of a chain together are very common. Such devices, however, usually consist of a straight bar having a loop in its center for engaging one of the links and with its two end portions designed to engage a specially designed round link imposed in the chain. Obviously, such devices distort the straight line pull of the chain, will not selectively engage any one of the links of a chain, require on the other hand, a special receiving link, and have a tendency to become accidentally detached. I have overcome such disadvantages as will be hereinafter appreciated.

Referring to the drawing, I have used the numerals 10, 11, 12 and 13 to designate the ordinary oblong links of a chain. The two end links of this chain are designated by the numerals 12 and 11. It is to such a chain or chains that I apply my chain fastening unit and which I will now describe.

Figure 2:
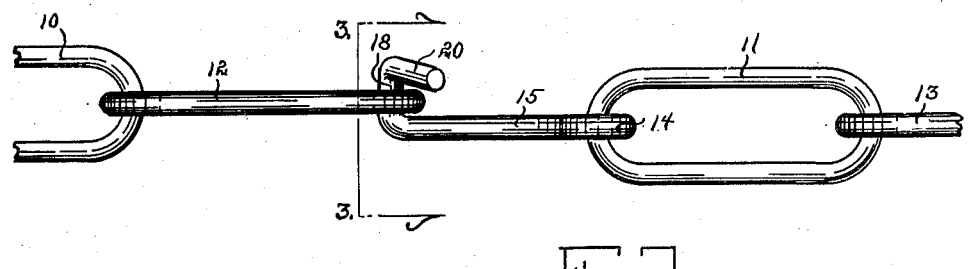
Fig. 2 is a side view of my chain fastener detachably securing two links of a chain together.
Figure 3:
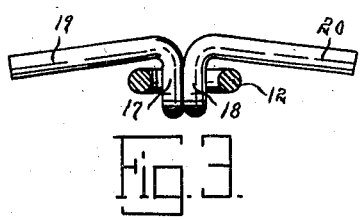
Fig. 3 is a cross sectional view of my device on a chain taken on line 3—3 of Fig. 2.

My chain fastener is formed from a single strand of rod material and is bent and formed into the arrangement and construction as shown in the drawing. The numeral 14 designates the loop portion of my fastener formed in the center of the links of the device and loosely embracing a chain link 11 as shown in Fig. 1. From this portion 14 my fastener extends directly forwardly to provide elongated neck or central portions 15 and 16. These two portions 15 and 16 extend parallel and adjacent each other. At the outer ends of the portions 15 and 16, the fastener is bent in substantially right angles to the portions 15 and 16 to form the hook portions 17 and 18 as shown in Fig. 3. At the outer ends of the portions 15 and 16, the fastener has its two end portions bent outwardly and slightly rearwardly as shown in Fig. 1 and Fig. 2. These two end portions 19 and 20 which extend away from each other besides extending rearwardly also extend slightly downwardly as shown in Fig. 3.

To attach my fastener to any of the oblong links of a chain, it is merely necessary to place the fastener transversely of the link to be engaged as shown in Fig. 1, insert first one of the end portions of the fastener through the link and then the other end portion of the fastener through the link and rotate the fastener in the link to a position as shown in Fig. 2. Obviously, when my fastener is in this position, its two lengths 15 and 16 will extend at one side of the engaged link, the hook portions 17 and 18 will extend through the link and the portions 19 and 20 will extend outwardly adjacent the opposite side of the engaged link, thereby rigidly securing the permanent link 11 of the fastener to the engaged link. By the employment of the portions 15 and 16 and the transversely arranged hook portions 17 and 18, when the chain is tightened as shown in Fig. 2 there will be no distortion of the chain and the line of pull on the chain will be substantially straight, thereby making for a very strong construction.

Furthermore, when my device is used for fastening animals, the chain is very comfortable to the necks of the animals. Another advantage of my fastener is due to this straight line pull there being less tendency for it to become accidentally detached. The prongs or end portions 19 and 20 by being bent outwardly, rearwardly and downwardly, also make accidental detachment almost impossible.

Although I show my fastener engaging an end link 12, it is obvious that it can engage any link in the chain, such as the link 10. The links 10 and 12 may be of the same chain as the links 11 and 13 or the links 10 and 12 may be of a different chain than the links 11 and 13.

To quickly remove my fastener from an engaged position, it is merely necessary to rotate it to a position shown by dotted lines in Fig. 1 and bring the end portions 19 and 12 out through the receiving link.

The outer end portions or prongs 19 and 20 should have a combined length greater than the inside length of the chain lengths. A prong or end portion taken singly, however, obviously has a length less than the inside length of the receiving chain link.

Some changes may be made in the construction and arangement of my improved chain fastener without departing from the real spirit and purpose of my invention, and it is my intention to cover by my claim any modified forms of structure or use of mechanical equivalents which may be reasonably included within its scope.

I claim:

In a single piece detachable chain fastener, a loop portion designed to embrace a chain link, forwardly extending neck portions extending in a straight line from and integrally formed on the two ends of said loop portion; said loop portion and said neck portions being in the same plane, a hook portion integrally formed on the outer end of each of said neck portions and extending at substantially a right angle to the neck portion on which it is formed; said hook portions designed to detachably engage a chain link, and an elongated straight arm portion formed on the outer end of each of said hook portions; said arm portions extending outwardly away from each other, slightly rearwardly relative to said neck portions, and at an angle to said hook portions slightly less than a right angle.

HANS A. NELSON.